Nov. 20, 1928.
W. A. VAN BRUNT
1,692,007
BEARING
Filed June 29, 1922
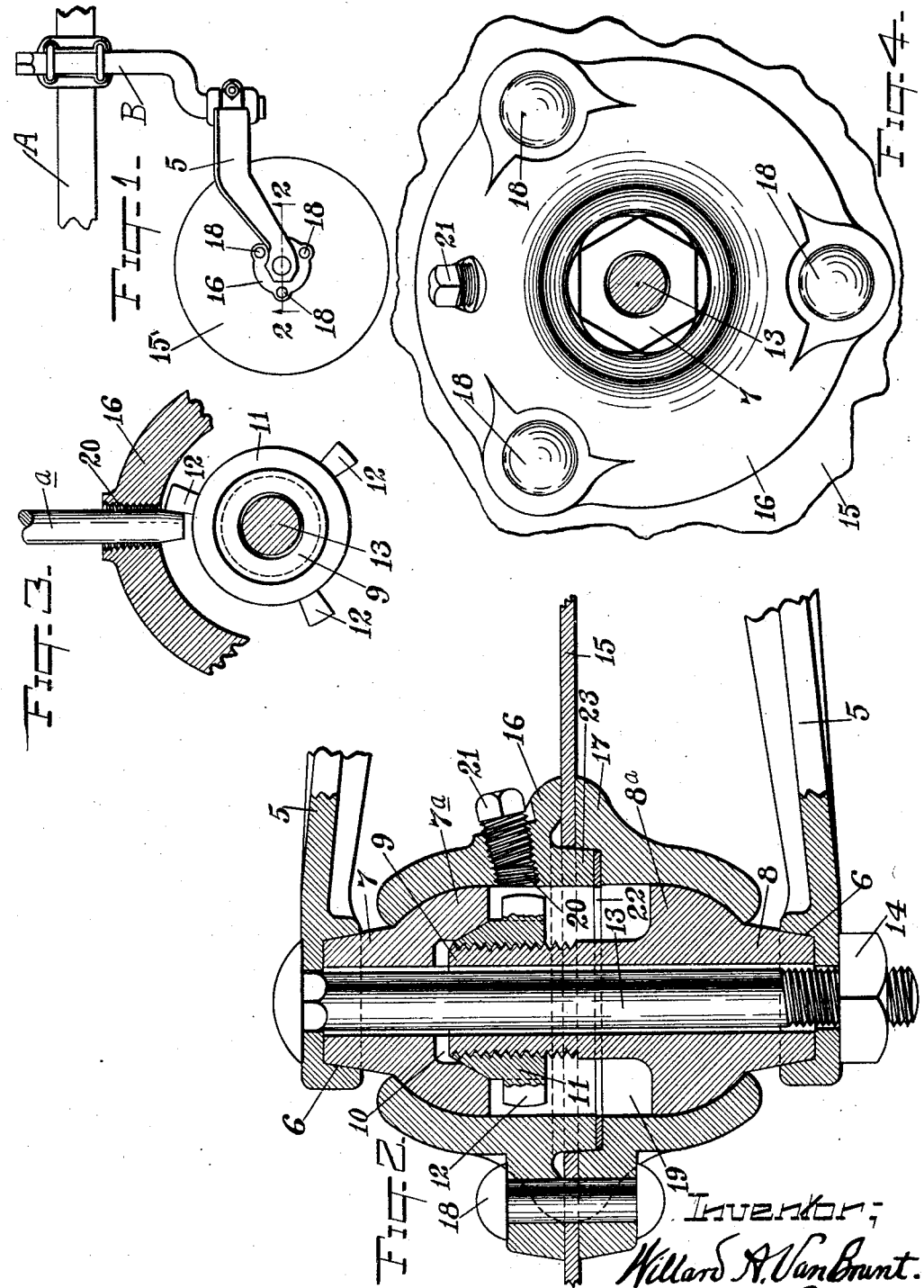

Patented Nov. 20, 1928.

1,692,007

UNITED STATES PATENT OFFICE.

WILLARD A. VAN BRUNT, OF LOS ANGELES, CALIFORNIA, ASSIGNOR TO DEERE & COMPANY, OF MOLINE, ILLINOIS, A CORPORATION OF ILLINOIS.

BEARING.

Application filed June 29, 1922. Serial No. 571,774.

This invention relates to improvements in bearings that, while especially designed for use in connection with colters for plows, are adapted for use in other situations where the bearings are subjected to hard usage and consequently require adjustments from time to time to compensate for wear. The objects of my invention are to provide a construction that will permit the required adjustments for compensating for wear between the rotating member and the bearing surface upon which it is mounted to be made readily and quickly; to provide a reservoir for lubricant between the rotatable member and the bearing therefor whereby the bearing faces of said two parts will be kept lubricated; to provide for permanently locating the movable adjusting means in said reservoir, and to improve generally devices of this general character. I accomplish these objects by the construction and arrangement of parts shown in the drawing and hereinafter particularly described.

In the drawing,—

Fig. 1 is a side elevation of a plow-colter connected as usual to a standard clamped to a plow-beam;

Fig. 2 is an enlarged sectional view taken on the line 2—2 of Fig. 1 and illustrating my improvements;

Fig. 3 is a detail partly in elevation and partly in section and illustrating the manner of adjusting the bearing that the colter hub rests upon to compensate for wear between the bearing surfaces of such parts,—a bar being shown as inserted in the opening through which lubricant is inserted in the reservoir; and Fig. 4 is an end view of the hub and its bearing as seen from the side opposite to that shown in Fig. 1, the colter-fork being removed and the bolt that secures the colter to the fork being shown in section.

Referring to the several figures of the drawing,—A indicates a portion of a plow beam, to which is clamped in any usual manner a standard B. To the lower end portion of the standard B is secured the forward end of a fork, the attachment of the fork being such as to permit it to have a limited swiveling action, as usual. The two arms of the fork are indicated by 5. In the rear end of each fork arm is a recess 6 adapted to receive and securely hold against rotation the spindle upon which the rotating member—which is here illustrated as a colter—is rotatably mounted. To prevent any rotative movement of the spindle, the holes 6 and the spindle ends that project therein are made with one or more flattened surfaces, as, for example, hexagonal in shape, as clearly shown in Fig. 4.

The spindle referred to comprises two coaxially disposed conical members, which are indicated respectively by 7 and 8. The inner portion of each spindle member is enlarged to respectively form heads 7ª and 8ª, the outer surfaces of such heads being rounded or curved as shown in Fig. 2. Projecting centrally from the enlargement or head of the spindle member 8 is a stem 9 that extends toward the member 7 and, in the construction shown, projects into an annular recess 10 formed in the inner face of the head of said member 7. The stem 9 is exteriorally screw-threaded, and screwed thereupon is a nut 11 which at one end is beveled, and such beveled portion fits against a corresponding bevel of the wall of the recess 10 in the head of the spindle member 7. The engagement of these two bevelled or conical surfaces aids in maintaining proper alinement between the two conical bearing members 7 and 8. Projecting from the surface of the nut are a number of lugs 12 that are made use of in screwing the nut along the threaded stem 9, as will be hereinafter explained, and while three are shown, any desired number may be employed,—one indeed being sufficient, as will be better understood when the manner of adjusting the nut is described. The spindle is held in place between the fork arms 5 by a bolt 13 that passes through such fork arms and through the spindle members, as clearly shown in Fig. 2, the head of the bolt lying against the outer face of one of the fork arms and the other end portion of the bolt being screw-threaded to receive a nut 14 that is tightened up against the other fork arm.

15 indicates a plow-colter having a large central opening therethrough for the passage of the spindle. The colter is rotatably mounted upon the two members of the spindle by means of a hub, which is here shown as formed in two parts 16 and 17, lying on opposite sides of the colter, such two parts of the hub being secured together and to the colter by rivets 18. These hub parts have conical inner bearing faces shaped to correspond to the curvature of the spindle members, and the contacting faces of the spindle members and hub parts will be chilled, smooth surfaces so as to permit of the rotation of the colter disc with the minimum of friction. It is necessary, or at least highly desirable, that the wearing surfaces be kept constantly lubricated, and a reservoir or chamber for containing a comparatively large amount of grease or liquid lubricant is provided between the spindle members, from which reservoir or chamber the lubricant can pass to the contacting surfaces of the spindle and hub. This reservoir or chamber is indicated by 19. The filling opening for this reservoir is through one of the hub parts—the part 16 in the construction shown—and is indicated by 20. It is screw-threaded to receive a screw-threaded plug 21 which normally closes it. In order to prevent leakage as far as possible at the joint between the hub parts, I provide one of such hub parts on its inner face with an annular recess in which is seated a gasket 22, and into this annular recess and resting against said gasket is an annular projection 23 that is formed on the other hub part.

With the parts constructed and arranged as shown in Fig. 2, it will be evident that the curved faces of the spindle members will furnish an approximately perfect bearing for the complementary surfaces of the hub parts that bear thereon, and that such bearing surfaces will be kept lubricated by the lubricant that slowly escapes from the quantity in the central reservoir 19. When, however, wear develops sufficiently to make it desirable to readjust the spindle members with respect to the hub parts that bear thereon, the closure plug 21 will be removed and through the opening 20 will be inserted a rod or bar $a$, such rod or bar being inserted far enough so as to be brought into contact with one of the lugs 12 if the colter and its attached hub be rotated. To make an adjustment between the bearing surfaces, the operator will, after first partially unscrewing the nut 14 on the bolt 13, turn the colter, and as the rod or bar $a$ that has been inserted through the hole 20, as stated, comes in contact with one of the lugs 12 on the nut 11, the result will be to turn such nut, and, inasmuch as the spindle members are held against rotation, the effect will be to force such spindle members outwardly,—the yoke arms yielding under this pressure sufficiently to permit such movement of the spindle members. Owing to the curvature of the wearing faces, it will be evident that a comparatively slight endwise movement of the members 7 and 8 is all that will be required to bring the parts into new relative positions, and thus compensate for the wear that has occurred. After the desired adjustment has been made the nut 14 will again be tightened up. While a single lug 12 could be provided for the nut 11, yet I prefer to provide a number of them, so that in making the adjustment described it will not be necessary to rotate the colter sufficiently far to cause the lubricant in the reservoir or chamber 19 to escape through the opening 20.

By my invention I provide an efficient bearing for devices of the character specified, and one capable of carrying a comparatively large amount of lubricant, so as to insure the wearing surfaces being properly lubricated at all times, and also a construction that permits at any time the required adjustment of the bearing members in such manner as to compensate for wear.

While, as stated, the invention is of particular value in connection with a plow-colter, inasmuch as bearings for such devices are always subjected to severe treatment by reason of the implement working in dirt and trash, yet, in its broader aspects, the invention is applicable to any other situations involving a rotating member where it is desirable that means be provided for adjustments from time to time to compensate for the wear that occurs between such member and the bearing upon which it is mounted.

What I claim as my invention and desire to secure by Letters Patent, is—

1. In combination, a bearing spindle comprising two endwise-movable non-rotating members each having its inner end portion enlarged to form a head, said heads being spaced apart to form a reservoir for lubricant, a rotatable device mounted on said heads and extending over and forming a cover for said reservoir, and movable means located in said reservoir adapted when moved to force said spindle members in opposite directions, said movable means being supported by one of said members and bearing against the other member.

2. In combination, a bearing spindle comprising two endwise-movable non-rotating members each having its inner end portion enlarged to form a head, said heads being spaced apart to form a reservoir for lubricant, a rotatable device mounted on said heads and extending over and forming a cover for said reservoir, and a nut located in said reservoir and rotatably connected with one of said members and bearing against the other member and adapted when turned to force said members in opposite directions.

3. In combination, a bearing spindle comprising two endwise-movable non-rotating members each having its inner portion enlarged to form a head, said heads being spaced apart to form a reservoir for lubricant, a stem carried by one of said members and projecting through said reservoir toward the said other member, means mounted on said stem and in contact with said other member adapted by being moved to force said members in opposite directions, and a rotatable device mounted on said heads and extending over and forming a cover for said reservoir.

4. In combination, a bearing spindle comprising two endwise-movable non-rotating members spaced a distance apart to form a reservoir for lubricant between them, a rotatable device supported on said members and forming a cover for said reservoir, and means within said reservoir and accessible through an opening in the wall of said rotatable device for simultaneously forcing said non-rotating members in opposite directions.

5. In combination, a rotatable device, a bearing spindle comprising two endwise-movable members upon which said device is mounted, means supporting the outer ends of said members and holding such members against rotation, a bolt extending through said members and the said supporting means, other means interposed between said members for forcing them and the supporting means in opposite directions, and a nut on said bolt for holding said parts locked in different adjusted positions.

6. In combination, a rotatable device, a bearing spindle comprising two endwise-movable members upon which said device is mounted, means supporting the outer ends of said members and holding such members against rotation, a stem connected centrally with one of said members and extending toward the other member, a nut rotatably mounted on said stem and bearing against said other member and adapted when rotated to force said two members and their supporting means in opposite directions, a bolt passing through the said members, the stem and the supporting means, and a nut on said bolt for holding said parts locked in different adjusted positions.

7. In combination, a bearing spindle comprising two coaxially disposed conical bearing members, two spaced supporting arms having non-circular sockets in the inner faces thereof, said bearing members having non-circular end portions engaging non-rotatably in said sockets, a bolt passing through said bearing members and said arms for drawing the same into cooperative engagement, one of said bearing members having an axially arranged, screw-threaded stem projecting toward the other member, a nut screwed upon said stem and adapted to force said bearing members outwardly away from each other, said nut having a conical thrusting surface engaging a cooperating conical thrusting surface on the other bearing member, and a rotatable device having a hub adapted to bear upon the conical outer surfaces of said bearing members.

8. In combination, a bearing spindle comprising two coaxially disposed conical bearing members, two spaced supporting arms on the outer sides of said bearing members, a bolt passing through said bearing members and said arms, one of said bearing members having an axially arranged, screw-threaded stem formed integral therewith and projecting toward the other bearing member, a nut screwed upon said stem and adapted to force said bearing members outwardly away from each other, said nut having a conical thrusting surface engaging a cooperating conical thrusting surface on the other bearing member, said conical thrusting surfaces aiding to maintain alinement between said bearing members, and a rotatable device having a hub adapted to bear upon the conical outer surfaces of said bearing members.

9. In combination, a bearing spindle comprising two endwise-movable bearing members, each having its inner portion enlarged to form a head, said heads being spaced apart to form a reservoir for lubricant, two spaced supporting arms having non-circular sockets therein, said bearing members having non-circular outer end portions engaging non-rotatably in said sockets, a bolt passing through said bearing members and said arms for drawing the same into cooperative engagement, one of said bearing members having an axially arranged screw threaded stem projecting through said reservoir toward the other of said bearing members, a nut screwed upon said stem and adapted to force said bearing members outwardly away from each other, said nut having a conical thrusting surface engaging a cooperating conical thrusting surface on said other bearing member, said conical thrusting surfaces aiding to maintain alinement between said bearing members, and a rotatable device mounted on said bearing heads and extending over and forming a cover for said reservoir.

WILLARD A. VAN BRUNT.